United States Patent
Kozerski

[11] Patent Number: 5,921,558
[45] Date of Patent: Jul. 13, 1999

[54] HIGH RECOVERY COMBUSTION SEAL GASKET

[75] Inventor: Richard J. Kozerski, Lisle, Ill.

[73] Assignee: Dana Corporation, Toledo, Ohio

[21] Appl. No.: 08/839,659

[22] Filed: Apr. 15, 1997

[51] Int. Cl.[6] ................................................ F02F 11/00
[52] U.S. Cl. .................................. 277/593; 277/601
[58] Field of Search ........................ 277/593, 598, 277/600, 601, 591, 610

[56] References Cited

U.S. PATENT DOCUMENTS

| | | | |
|---|---|---|---|
| 1,856,051 | 4/1932 | Fryling | 277/610 X |
| 1,942,704 | 1/1934 | Hubbard et al. | 277/610 X |
| 4,477,094 | 10/1984 | Yamamoto et al. | 277/235 |
| 4,519,619 | 5/1985 | Doyle | 277/166 |
| 4,746,402 | 5/1988 | Maloney et al. | 162/108 |
| 4,781,389 | 11/1988 | Beyer et al. | 277/601 |
| 5,308,090 | 5/1994 | Hamada et al. | 277/204 |
| 5,411,274 | 5/1995 | Yahagi et al. | 277/203 |
| 5,505,466 | 4/1996 | Willis et al. | 277/593 X |
| 5,511,797 | 4/1996 | Nikirk et al. | 277/610 X |
| 5,669,613 | 9/1997 | Lubienski | 277/610 |

OTHER PUBLICATIONS

*Leader Spiralwound Gaskets* article located on the Internet at http://www.leadergasket.com/spirals.htm.
*Billi* article located on the Internet at http://dbserver.wlon-line.de:8000/homes/596343d/spira.html.
*Lamons Spiralwound Styles* located on the Internet at http;//www.lamonsgasket.com/sp—lstyle.htm.

*Primary Examiner*—Lynne A. Reichard
*Assistant Examiner*—David E. Bochna
*Attorney, Agent, or Firm*—Rader, Fishman & Grauer PLLC

[57] ABSTRACT

A cylinder head gasket assembly of the present invention includes a main gasket body and a fluid flow opening. A spiral wound component is received within and engages an inner periphery of the fluid flow opening to provide enhanced dynamic recovery and sealing to the fluid flow opening. In one embodiment a generally U-shaped flange engages the inner periphery of the fluid flow opening with the spiral wound gasket disposed within the flange.

18 Claims, 1 Drawing Sheet

HIGH RECOVERY COMBUSTION SEAL GASKET

FIELD OF THE INVENTION

The present invention relates generally to the fabrication of an engine cylinder head gasket assembly. More particularly, the invention relates to a gasket assembly with improved performance through the use of a spiral wound component.

BACKGROUND OF THE INVENTION

Gasket assemblies are often used as a seal between mating mechanical components. One common application involves gasket assembly placement between the engine block and cylinder head of an internal combustion engine. The engine block and cylinder head are bolted together and the gasket relies on the force of the bolted connection to seal the various openings between the two mating components. In particular, cylinder head gasket assemblies typically extend around cylinder bores to provide a combustion seal, maintaining the high temperature gases of combustion within the combustion opening. Simultaneously, the gasket assemblies also seal fluid flow openings such as coolant and oil openings to prevent undesirable mixing or leakage.

It is typical for a cylinder head gasket assembly to include a main gasket body with a cylinder bore opening, the inner periphery of which is surrounded by a metallic generally U-shaped flange. The flange engages both the upper face and the lower face of the main gasket body. Retained within the flange is a yieldable fire ring typically made from metal. The flange and fire ring work in combination to provide a primary combustion seal while the main gasket body provides structural support for both the flange and the fire ring and acts as a secondary combustion seal.

A yieldable fire ring has drawbacks as a gasket assembly component. It has limited elasticity and tends to plastically deform over time, greatly decreasing its elastic properties. Further, new engines are being introduced which have significantly increased firing pressures and operating temperatures with lower bolt clamping forces and engine component stiffness.

To address some of these concerns main gasket bodies have been formed from composite materials with improved thermal conductivity. However, many of these composite materials have a reduced ability to withstand the stresses and strains induced by the bolted connection of the mating components. In particular, graphite has been the optimum material for use in a variety of composite head gasket designs. It includes improved conformability, heat resistance and relaxation properties when compared to other fiber-based replacement materials. Yet, it has a very low shear strength which allows for the thermally induced lateral relative motion of the cylinder head and engine block to move the flange laterally back and forth. Further, graphite also includes a relatively low spring rate which can allow for greater lift-off deflections at the cylinder bore opening. Unfortunately, the low spring rate remains almost constant even after prolonged exposure to heat. Therefore, the dynamic stresses are unable to decrease over time.

When a flange is used, it relies on both the fire ring and the main gasket body for support. As a result, the flange is subjected to greater dynamic stresses induced through the use of a main gasket body formed from composite materials and may fail over time in a form of combustion seal fatigue failure commonly known as "flange cracking".

SUMMARY OF THE INVENTION

The present invention is directed to a gasket assembly which includes a main gasket body and a separate spiral wound component. The main gasket body has a fluid flow opening defined by an inner periphery of the main gasket body. The spiral wound component is secured to the periphery of the main gasket body and extends radially inwardly into the fluid flow opening. It may include a wound strip of metal, a cross-section of the strip having two ends and a bowed center portion. In some embodiments, the spiral wound component may include alternating strips of metal and a heat conductive filler to dissipate heat.

The spiral wound component is secured to the main gasket body using one or more of several methods. In many instances, the spiral wound component is press fitted into the fluid flow opening. It may be welded if the main gasket body is also formed from metal. Alternatively, a high temperature adhesive may be used. In a different preferred embodiment, the spiral wound component is disposed in a generally U-shaped flange, the flange including opposing legs which each engage an outer face of the main gasket body. If received in a U-shaped flange, the spiral wound component is preferably press fitted such that the gasket is elastically compressed between the two legs of the flange.

When used in combination with the main gasket body, the spiral wound component provides excellent dynamic recovery properties which results in an improved primary combustion seal. When combined with a flange, the spiral wound gasket contributes additional structural support to the flange, helping to eliminate undesirable flange cracking.

BRIEF DESCRIPTION OF THE DRAWINGS

The features and inventive aspects of the present invention will become more apparent upon reading the following detailed description, claims, and drawings, of which the following is a brief description:

FIG. 3 is a planar view of the spiral wound component adapted to be secured to the main gasket body.

FIG. 4 is a cross-sectional view of the metal strip used in the spiral wound gasket according to one embodiment of the invention.

FIG. 5 is a cross-sectional view of a metal strip and an alternating filler strip of a spiral wound component according to a different embodiment of the invention.

DETAILED DESCRIPTION OF A PREFERRED EMBODIMENT

Figure 1:
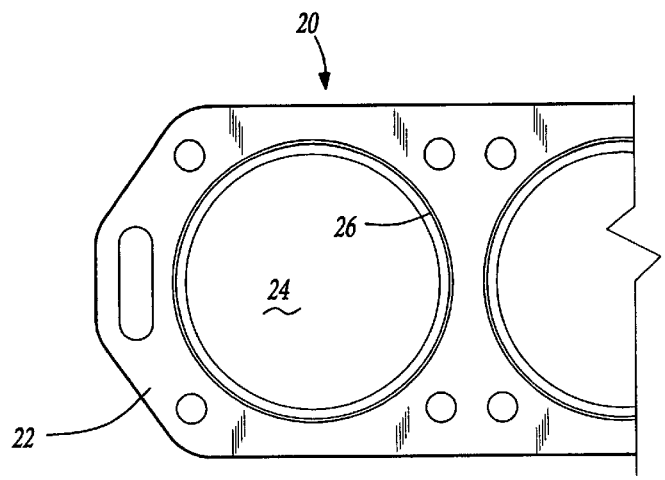
FIG. 1 is a planar view of a cylinder head gasket assembly according to the present invention.

As illustrated in FIG. 1, the present invention is directed to a cylinder head gasket assembly 20 having a main body 22, and a plurality of fluid flow openings, the openings including combustion bore openings 24. Opening 24 includes an inner periphery 26 which extends about a longitudinally extending axis.

Figure 2:
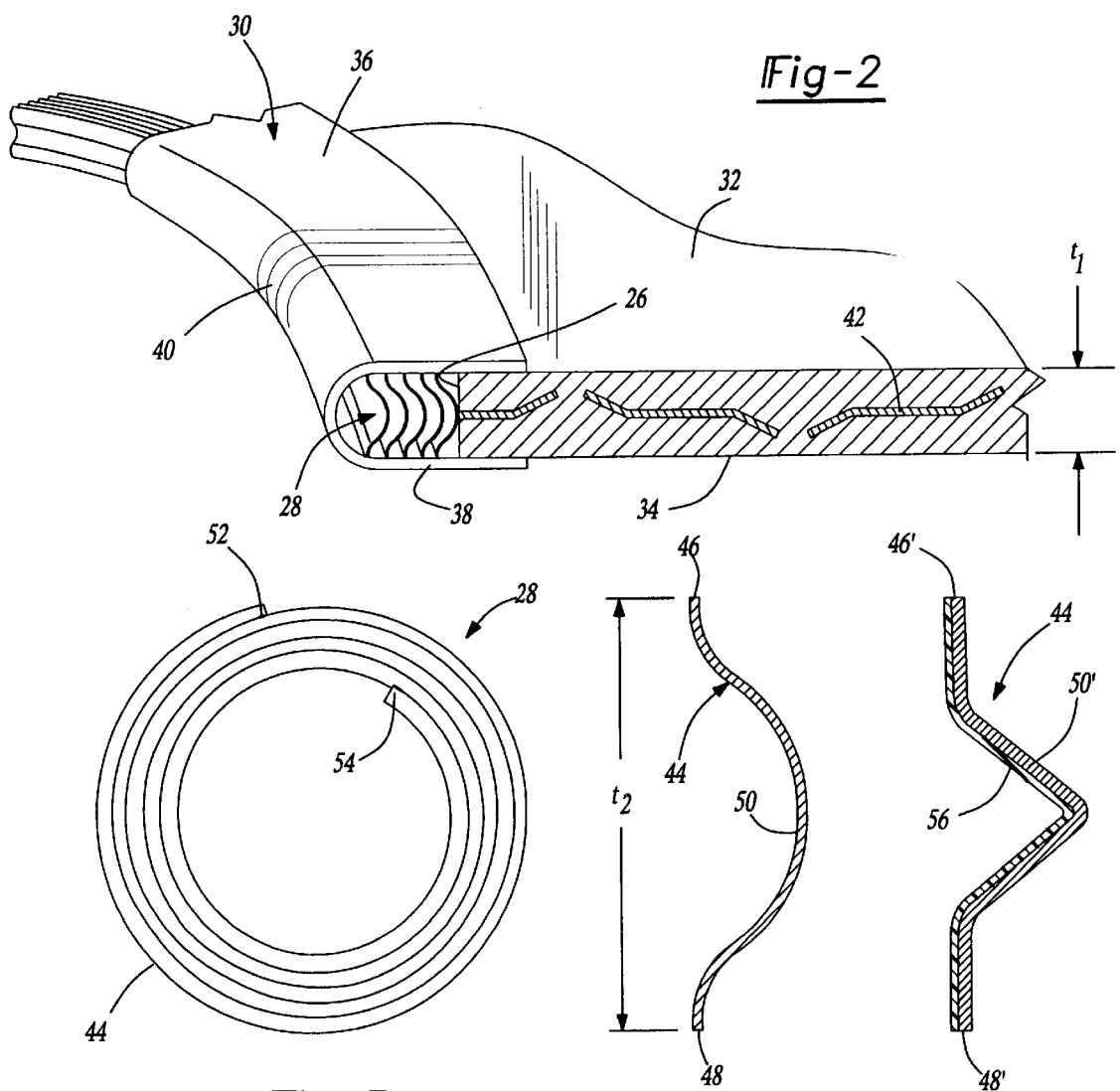
FIG. 2 is a perspective view of a portion of the cylinder head gasket assembly according to a first embodiment of the invention.

A spiral wound component 28 is secured to inner periphery 26 of opening 24, as best illustrated in FIG. 2. In some instances, a press fit between spiral wound component 28 and main gasket body 22 is sufficient. Alternatively, spiral wound component 28 may be welded to inner periphery 26 of main gasket body 22 if the main gasket body is formed from metal. Gasket 28 may also be secured to main gasket body 22 by means of a high temperature adhesive or through the use of a U-shaped flange 30. For many applications, the use of flange 30 eliminates the need for either a weld or an adhesive.

Flange 30 is received within opening 24 and disposed about inner periphery 26. Main body 22 includes an upper face 32 and a lower face 34. U-shaped flange 30 has opposing legs 36, 38 separated by a central section 40. Leg 36 engages face 32 and leg 38 engages lower face 34. Central section 40 is generally arcuate and extends radially inwardly into opening 24 away from periphery 26. Besides helping to secure gasket 28 to main gasket body 22, flange 26 provides improved protection to main body 22 from the high temperature gases of combustion and serves to dissipate the heat of combustion into main gasket body 22 and away from cylinder bore opening 24.

Main gasket body 22 may be formed from a wide range of different materials including metal. However, more commonly, body 22 is formed from a composite material having an improved thermal conductivity to respond to the ever increasing temperature demands placed on cylinder head gasket assemblies. However, many of these composite materials have a reduced ability to withstand the stresses and strains induced by the bolted connection of the mating components. In many cases, graphite has been the optimum material for use in a variety of composite head gasket designs. It includes improved conformability, heat resistance and relaxation properties when compared to other asbestos replacement materials. Yet, it has a very low shear strength which allows for the thermally induced lateral motion of the cylinder head and engine block. Further, graphite also includes a relatively low spring rate which can allow for greater lift-off deflections at the cylinder bore opening. Unfortunately, the low spring rate remains almost constant even after prolonged exposure to heat. Therefore, the dynamic stresses are unable to decrease over time. Such limitations are of particular concern as combustion bore pressures increase while clamping forces and the stiffness of both the cylinder head and engine block decrease. If an inadequate combustion seal is maintained about periphery 26 of opening 24, gasket assembly 20 will fail.

A spiral wound component has been used in different industrial applications. Such a gasket has been mounted to a flange located between an exhaust manifold and an exhaust pipe in an internal combustion engine. Yet, the prior art teaches that spiral wound components do not easily lend themselves to use in automotive environments. More specifically, a spiral wound component has not been used in place of a fire ring as a component of a more complete cylinder head gasket assembly 20. Yet, when used in combination with main gasket body 22 within combustion bore opening 24, gasket 28 provides excellent dynamic recovery properties and contributes to a primary combustion seal which exceeds that experienced with prior art fire rings. When combined with flange 30, gasket 28 provides additional structural support to flange 30, helping to eliminate undesirable flange cracking. Flange cracking has proven to be of particular concern when main gasket body 22 is formed from a composite material such as graphite.

As shown in FIGS. 3 and 4, gasket 28 has a single wound strip 44 of metal, the strip having two longitudinal ends 46, 48 and a bowed center portion 50. Bowed portion 50 preferably includes a generally flat section to promote engagement with periphery 26. Typically, strip 44 is formed from a stainless steel alloy because of its elasticity in combination with heat and chemical resistance. However, other metals may also be used depending on the application and environment. Preferably, center portion 50 extends radially outwardly to engage inner periphery 26 and is press fitted into opening 24 such that gasket 28 is biased against inner periphery 26.

Main gasket 22 has a thickness $t_1$ defined between upper and lower faces 32, 34. In a relaxed state, gasket 28 has a longitudinal extent or thickness $t_2$ between longitudinal ends 46 and 48 which is at least as great as $t_2$ and preferably slightly greater. When gasket assembly 20 is installed between a cylinder head and an engine block without the use of a flange 30, gasket 28 is compressed, the shape of strip 44 acting as an elastic spring to longitudinally bias gasket 28. When gasket 28 is received within flange 30, longitudinal ends 46 and 48 are elastically biased against legs 36 and 38 respectively to provide additional support to the flange and to compensate for the dynamics stresses and strains which can otherwise lead to flange cracking and gasket assembly failure. To provide adequate biasing support in both the radial and longitudinal directions, spiral wound component 28 has between three and five windings of strip 44. The beginning and terminal ends 52, 54 of strip 44 are typically spot welded to the adjacent winding. In some applications an optional radially inner metal guide ring or centering ring may be appropriate for use with gasket 28. It may also be necessary to plate or otherwise coat strip 44 to provide enhanced corrosion and temperature resistance.

Center portion 50 is usually generally U-shaped to provide an increased area of engagement with periphery 26 for the purpose of load distribution and attachment if welding or an adhesive are used. However, such a center portion is not required. Instead, as shown in FIG. 5, center portion 50' may have many other shapes, including a V-like shape. Further, gasket 28 may include alternating windings of metal strip 44' and a filler strip 56. A filler strip 56 is more likely to be used with metallic main gasket bodies 22 where less support is required for flange 30 or to gasket assembly 20 overall, but heat dissipation is of greater concern. Typical filler material includes flexible graphite or Teflon®.

The disclosed embodiments and examples are given to illustrate the present invention. However, they are not meant to limit the scope and spirit of the present invention. Therefore, the scope of the present invention should be considered by reviewing the appended claims.

What is claimed is:

1. A cylinder head gasket assembly comprising:

a main gasket body having an upper face and a lower face, said main body including a fluid flow opening defined by an inner periphery of said main gasket body, said opening extending about a longitudinally extending axis;

a spiral wound component secured to said periphery of said main gasket body and extending radially inwardly of said periphery, said spiral wound component comprising a wound strip, a cross-section of said strip having two longitudinal ends and a bowed center portion; and a metallic generally U-shaped flange having opposing legs separated by a central section disposed within said fluid flow opening, an upper leg engaging said upper face and a lower leg engaging said lower face with said central section extending radially into said opening away from said periphery, wherein said spiral wound component is disposed within said flange between said inner periphery and said central portion and each of said legs.

2. A cylinder head gasket assembly as recited in claim 1, wherein said center portion of said strip extends radially outwardly and said spiral wound component is biased radially outwardly to engage said inner periphery of said fluid flow opening.

3. A cylinder head gasket assembly as recited in claim 2, wherein said spiral wound component is press fitted into said fluid flow opening.

4. A cylinder head gasket assembly as recited in claim 2, wherein said center portion of said strip is generally U-shaped.

5. A cylinder head gasket assembly as recited in claim 4, wherein said center portion includes a longitudinally extending generally flat section which is secured to said inner periphery.

6. A cylinder head gasket assembly as recited in claim 5, wherein said flat section is either welded or adhesively bonded to said inner periphery of said fluid flow opening.

7. A cylinder head gasket assembly as recited in claim 1, wherein said spiral wound component is wound at least three times about said periphery of said opening.

8. A cylinder head gasket assembly as recited in claim 1, wherein a first longitudinal extent is defined between said faces of said main gasket body and the distance between said ends of said spiral wound component define a second longitudinal extent at least equal to said first longitudinal extent.

9. A cylinder head gasket assembly as recited in claim 1, wherein said spiral wound component includes a strip of soft filler alternating with a strip of metal.

10. A cylinder head gasket assembly as recited in claim 1, wherein said spiral wound component is press fitted within said fluid flow opening such that said strip is biased radially outwardly into engagement with said periphery.

11. A cylinder head gasket assembly as recited in claim 1, wherein said spiral wound component is press fitted within said flange such that said strip is biased into engagement with said legs of said flange.

12. A cylinder head gasket assembly comprising:

a main gasket body having an upper face and a lower face, said main body including a fluid flow opening defined by a periphery of said main gasket body, said opening defining a longitudinally extending axis;

a metallic generally U-shaped flange having opposing legs separated by a central section disposed within said fluid flow opening, an upper leg engaging said upper face and a lower leg engaging said lower face with said central section extending radially into said opening away from said periphery; and a spiral wound component disposed within said flange between said inner periphery and said central portion and each of said legs, wherein said spiral wound component comprises a wound strip of metal, a cross-section of said strip having two longitudinally extending ends and a bowed center portion.

13. A gasket assembly as recited in claim 12, wherein said center portion of said strip extends radially outwardly.

14. A gasket assembly as recited in claim 12, wherein said spiral wound component is press fitted into said fluid flow opening such that said strip is biased into engagement with said periphery.

15. A gasket assembly as recited in claim 12, wherein said spiral wound component is press fitted within said flange such that said strip is biased into engagement with said legs of said flange.

16. A gasket assembly as recited in claim 12, wherein said spiral wound component is press fitted into said fluid flow opening such that said strip is biased into engagement with said periphery, and wherein said spiral wound component is press fitted within said flange such that said strip is biased into engagement with said legs of said flange.

17. A cylinder head gasket assembly as recited in claim 12, wherein said bowed center portion is generally U-shaped.

18. A cylinder head gasket assembly as recited in claim 12, wherein said bowed center portion is generally V-shaped.

* * * * *

UNITED STATES PATENT AND TRADEMARK OFFICE
CERTIFICATE OF CORRECTION

PATENT NO : 5,921,558
DATED : July 13, 1999
INVENTOR(S) : Richard L. Kozerski

It is certified that error appears in the above-identified patent and that said Letters Patent is hereby corrected as shown below:

On title page, item 75 Inventor
replace "Richard J. Kozerski"
with --Richard L. Kozerski--.

Signed and Sealed this

Fourth Day of January, 2000

Attest:

Attesting Officer

Acting Commissioner of Patents and Trademarks